US012742856B2

(12) United States Patent
Jeannin et al.

(10) Patent No.: US 12,742,856 B2
(45) Date of Patent: Sep. 22, 2026

(54) COMPRESSIVE MULTIPLEXING FOR RECEIVED RADAR SIGNALS

(71) Applicant: Infineon Technologies AG, Neubiberg (DE)

(72) Inventors: Mayeul Jeannin, Munich (DE); Dian Tresna Nugraha, Bandung (ID); Farhan Bin Khalid, Munich (DE); Andre Roger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 279 days.

(21) Appl. No.: 18/501,150

(22) Filed: Nov. 3, 2023

(65) Prior Publication Data

US 2024/0385287 A1 Nov. 21, 2024

Related U.S. Application Data

(60) Provisional application No. 63/502,431, filed on May 16, 2023.

(51) Int. Cl.
*G01S 7/35* (2006.01)
*G01S 7/03* (2006.01)

(52) U.S. Cl.
CPC .............. *G01S 7/356* (2021.05); *G01S 7/032* (2013.01)

(58) Field of Classification Search
CPC .......... G01S 7/356; G01S 7/032; G01S 19/13; G01S 13/284; G01S 7/0234
USPC ........................................................... 342/70
See application file for complete search history.

(56) References Cited

U.S. PATENT DOCUMENTS 8,803,732 B2 * 8/2014 Antonik .................. G01S 7/288 342/25 R
9,541,638 B2 * 1/2017 Jansen .................. G01S 13/878
10,502,824 B2 * 12/2019 Roger ...................... G01S 7/023
10,539,658 B2 * 1/2020 Zivkovic ............... G01S 13/343
10,732,272 B2 * 8/2020 Kishigami ............ G01S 13/284
10,802,134 B2 * 10/2020 Roger ................... G01S 13/343
10,830,882 B2 * 11/2020 Shollenberger ....... G01S 13/582
(Continued)

FOREIGN PATENT DOCUMENTS

EP 1521978 B1 * 1/2007 ........... G01S 13/282
EP 3208632 A1 * 8/2017 ........... G01S 13/284
(Continued)

OTHER PUBLICATIONS

Avik Santra et al., "Ambiguity function and imaging performance of coded FMCW waveforms with fast 4D receiver processing in MIMO radar." Published 2019.
(Continued)

*Primary Examiner* — Nuzhat Pervin
(74) *Attorney, Agent, or Firm* — Eschweiler & Potashnik, LLC

(57) ABSTRACT

Systems, methods, and circuitries are disclosed for compressing radar data. In one example, a method includes receiving respective radar signals from a plurality of antennas; applying respective phase shifts to the respective received radar signals or to respective radar data derived from the respective received radar signals to generate respective coded radar signals or respective coded radar data; and combining the respective coded radar signals or the respective coded radar data to generate a compressed radar signal or compressed radar data.

15 Claims, 10 Drawing Sheets

(56) References Cited

U.S. PATENT DOCUMENTS

| | | | | |
|---|---|---|---|---|
| 11,340,332 | B2 * | 5/2022 | Cho | G01S 13/931 |
| 11,422,230 | B2 * | 8/2022 | Bogner | G01S 13/42 |
| 11,428,796 | B2 * | 8/2022 | Nam | G01S 13/931 |
| 11,747,436 | B2 * | 9/2023 | Subburaj | G01S 7/023 342/159 |
| 2014/0197983 | A1 * | 7/2014 | Reuter | G01S 13/343 342/175 |
| 2015/0160335 | A1 * | 6/2015 | Lynch | G01S 13/4418 342/194 |
| 2017/0242116 | A1 * | 8/2017 | Kishigami | G01S 13/581 |
| 2017/0248686 | A1 * | 8/2017 | Zivkovic | G01S 7/352 |
| 2018/0267158 | A1 * | 9/2018 | Kishigami | G01D 5/249 |
| 2018/0284258 | A1 * | 10/2018 | Roger | G01S 13/003 |
| 2019/0317205 | A1 * | 10/2019 | Meissner | G01S 7/354 |
| 2020/0072940 | A1 * | 3/2020 | Schrattenecker | G01S 13/343 |
| 2020/0191905 | A1 * | 6/2020 | Onic | G01S 7/352 |
| 2021/0003661 | A1 * | 1/2021 | Xu | G01S 13/931 |
| 2021/0116535 | A1 * | 4/2021 | Roger | H03M 7/30 |
| 2021/0173042 | A1 * | 6/2021 | Wu | G01S 7/356 |
| 2021/0255301 | A1 * | 8/2021 | Campbell | G01S 13/284 |
| 2021/0364599 | A1 * | 11/2021 | Roger | G01S 13/931 |
| 2021/0364622 | A1 * | 11/2021 | Roger | G01S 13/584 |
| 2021/0389452 | A1 * | 12/2021 | Lau | G01S 13/347 |
| 2022/0006432 | A1 * | 1/2022 | Heller | G01S 13/08 |
| 2022/0057482 | A1 * | 2/2022 | Fritzin | G01S 13/343 |
| 2022/0159097 | A1 * | 5/2022 | Sukumaran | G01S 13/584 |
| 2023/0118317 | A1 * | 4/2023 | Melzer | G01S 13/50 375/346 |
| 2023/0144333 | A1 * | 5/2023 | Yoffe | G01S 13/931 342/70 |
| 2023/0288531 | A1 * | 9/2023 | Spalink | G01S 7/295 |
| 2023/0288548 | A1 * | 9/2023 | Sanson | G01S 13/38 |
| 2023/0288555 | A1 * | 9/2023 | Sanson | G01S 7/354 |
| 2024/0230882 | A1 * | 7/2024 | Krutsch | G01S 13/788 |
| 2024/0310474 | A1 * | 9/2024 | Moriera | G01S 7/032 |
| 2024/0310505 | A1 * | 9/2024 | Petrov | G01S 13/584 |
| 2024/0361445 | A1 * | 10/2024 | Paker | G01S 13/42 |
| 2024/0377504 | A1 * | 11/2024 | Jansen | G01S 13/878 |
| 2024/0402324 | A1 * | 12/2024 | Scherz | G01S 7/35 |
| 2025/0172660 | A1 * | 5/2025 | Kishigami | G01S 7/354 |
| 2025/0347770 | A1 * | 11/2025 | Tang | G01S 7/352 |

FOREIGN PATENT DOCUMENTS

| | | | | |
|---|---|---|---|---|
| EP | 3916427 | A1 * | 12/2021 | G01S 13/34 |
| EP | 4431972 | A1 * | 9/2024 | G01S 13/931 |
| EP | 4564046 | A1 * | 6/2025 | G06F 17/18 |
| WO | WO-2016099806 | A1 * | 6/2016 | B60L 53/66 |

OTHER PUBLICATIONS

Nadjah Touati et al. “High Angle Resolution Automotive Radar Based on Simultaneous 12Tx Doppler-Multiplex MIMO.” Published on Jan. 15, 2021.

Anil Mani et al., “Memory Compression and Decompression Engine for TI mmWave Radar.” Published Dec. 2019.

* cited by examiner

COMPRESSIVE MULTIPLEXING FOR RECEIVED RADAR SIGNALS

CROSS-REFERENCE TO RELATED APPLICATIONS

This application claims the benefit of priority from U.S. Provisional Patent Application Ser. No. 63/502,431 filed on May 16, 2023, the contents of which is hereby incorporated in its entirety.

FIELD

The present disclosure relates to the field of radar circuits and in particular to methods, systems, and circuitry for using radar signals for detecting objects.

BACKGROUND

Radio frequency (RF) transceivers can be found in numerous applications, particularly in the field of wireless communications and radar sensors. In the automotive sector there is an increasing demand for radar sensors for use in detecting vehicles and other objects near a sensor-equipped vehicle.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
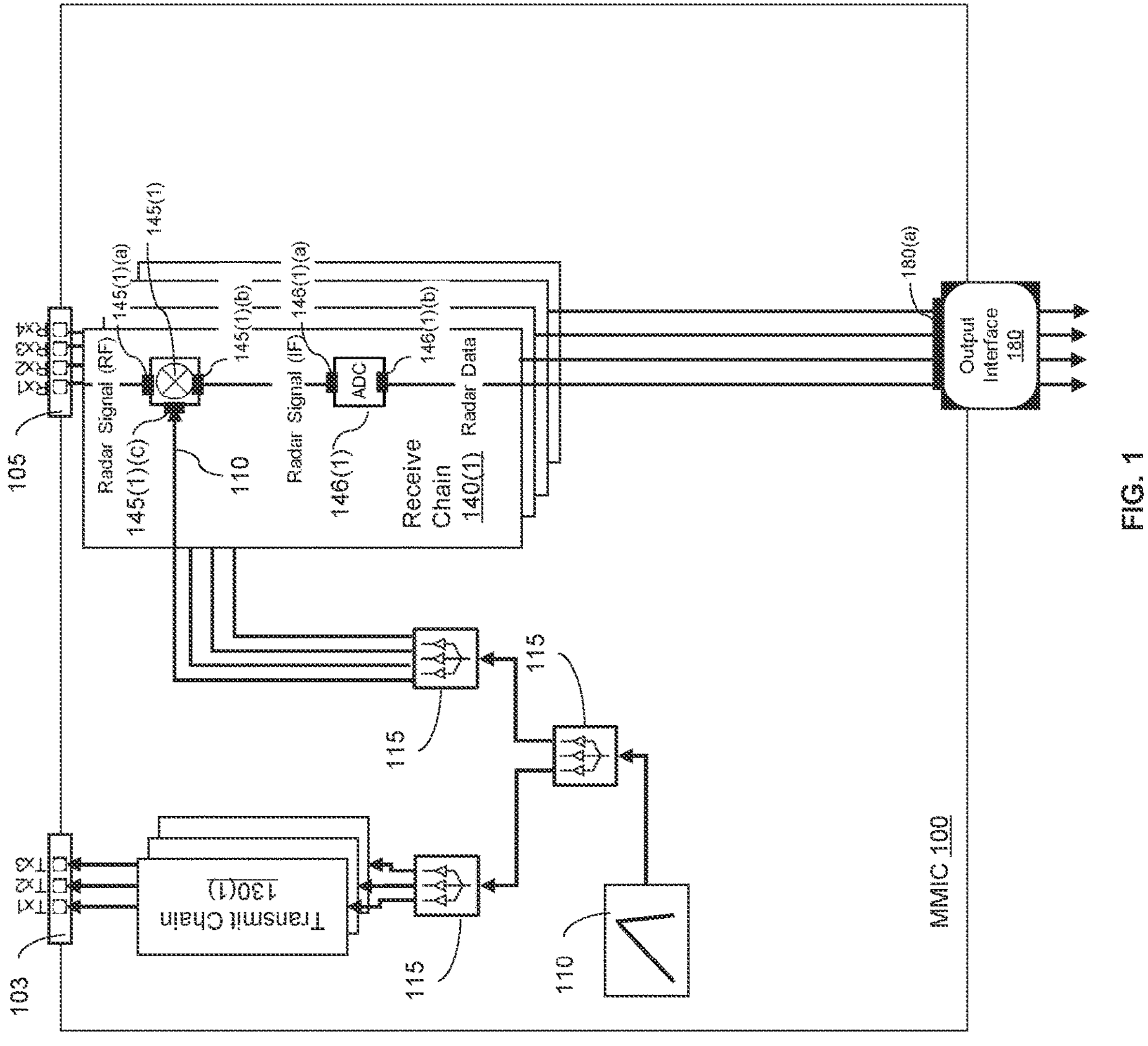
FIG. 1 illustrates an example monolithic microwave integrated circuit (MMIC), in accordance with various aspects described.

Throughout this description, components that are exemplary versions of a same or analogous component are assigned reference characters having the same value for the last two digits while the initial digit(s) of reference characters are assigned based on the FIG. number in which they are first introduced.

FIG. 1 illustrates an example monolithic microwave integrated circuit (MMIC) 100. The MMIC 100 synthesizes and transmits radio frequency (RF) signals and receives and down-converts RF signals. The MMIC 100 may be installed in a radar system-on-chip (SOC) (see FIG. 8). The MMIC 100 receives or generates a carrier frequency local oscillator (LO) signal 110. The LO signal 110 is frequency modulated to encode, for example, a series of frequency ramps (e.g., a chirp signal) or another waveform having properties that facilitate detection of targets by a radar system. The MMIC 100 includes several LO signal splitters 115 that split the LO signal for use by the transmit chains (referred to generally as 130 while only 130(1) is labeled in FIG. 1) and the receive chains (referred to generally as 140 while only 140(1) is labeled in FIG. 1).

The MMIC 100 includes a transmit antenna interface 103 configured for coupling to one or more transmit (TX) antennas (three TX antenna connections are shown by way of example). The MMIC 100 includes a respective transmit chain 130 coupled to each TX antenna connection. Each respective transmit chain 130 includes circuitry (e.g., amplifiers, mixers, and so on, not shown) that performs signal processing related to generating a TX signal based on the LO signal 110. The TX signal is output via the TX antenna interface 103 to a TX antenna. The respective transmit chains 130 may also perform phase shifting or other TX signal manipulation that may be used to distinguish received echoes of the respective TX signals from one another.

The MMIC 100 includes a receive antenna interface 105 configured for coupling to one or more receive (RX) antennas (four RX antenna connections are shown by way of example). The MMIC 100 includes a receive chain (referred to generally as 140 while only 130(1) is labeled in FIG. 1) coupled to each RX antenna connection. Each respective receive chain 140 is configured to receive the LO signal 110 from an LO signal splitter 115. Each respective receive chain 140 includes a respective mixer circuit (referred to generally as 145 while only 145(1) is labeled in FIG. 1) that includes a first input 145*a*, a second input, and an output 145(*c*). The first input is coupled to a LO signal splitter 115 to receive the LO signal and the second input is coupled to a respective receive antenna connection within the receive antenna interface 105. The mixer circuit 145 down-converts a received RF radar signal to an IF radar signal based on the LO signal 110. Each respective receive chain includes a respective analog-to-digital converter (ADC) (referred to generally as 146 while only 146(1) is labeled in FIG. 1) having an input 146(*a*) coupled to the output of the mixer circuit 145(*b*), The ADC converts the IF radar signal to digital radar data. For the purposes of this description, the term "radar signal" may be used in a general sense to refer to a received radar signal at any point as it passes from the RX antenna interface 105, through a receive chain 140, and to an output interface 180 of the MMIC. Thus radar signal refers to the received radar signal in RF, IF, and digital (post ADC) form.

An output of the ADC 146*b* is coupled to an input 180(*a*) of the output interface 180. The output interface 180 is configured for coupling to a digital signal processor (DSP) or other processing unit (see FIG. 7). The radar data from each receive chain is provided separately to the DSP for use in processing related to target detection. The MMIC 100 performs many other operations and includes additional circuitry not shown here for the sake of brevity.

As the number of receive antennas increases, the scaling of hardware (e.g., memory, registers, processors, and so on) necessary to process and subsequently transfer radar data received from each antenna becomes burdensome. Described herein are methods and systems for compressively multiplexing received radar signals or radar data derived from received radar signals associated with multiple receive antennas into a compressed radar signal or compressed radar data that can be processed by hardware that need only be capable of processing a radar signal or radar data received from a single antenna. A compressed radar signal comprises, for example, an analog signal that includes components corresponding to at least two received radar signals, multiplexed in time or frequency. Compressed radar data comprises, for example, a set of bits corresponding to a data word that includes bits encoding radar data associated with at least two received radar signals. Further, when a compressed radar signal is converted to a digital signal (e.g., via ADC) the result is compressed radar data.

Figure 2:
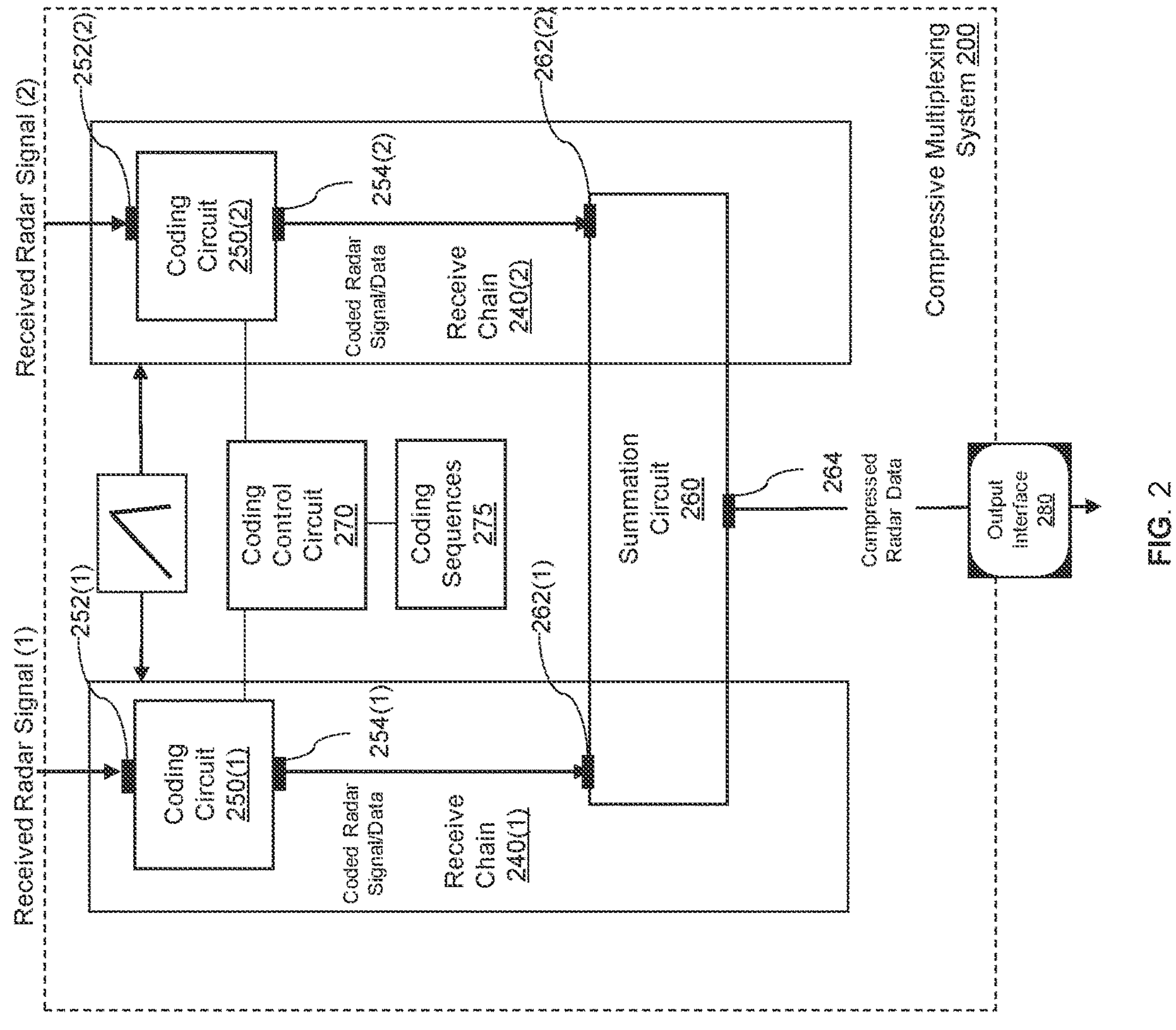
FIG. 2 illustrates a compressive multiplexing system, in accordance with various aspects described.

FIG. 2 illustrates an example compressive multiplexing system 200 that compresses two received radar signals to generate compressed radar data. The compressive multiplexing system includes a plurality of coding circuits 250(1), 250(2) associated with respective receive chains 240(1), 240(2), a summation circuit 260, and a coding control circuit 270 coupled to the respective coding circuits 250(1), 250(2). The coding control circuit 270 provides a first coding sequence to the first coding circuit 250(1) and a second coding sequence to the second coding circuit 250(2). The first and second coding sequences are members of a plurality of coding sequences stored in storage media or memory 275.

Each coding circuit 250(1), 250(2) includes a respective input 252(1), 252(2) that is coupled to a receive antenna connection and a respective output 254(1), 254(2) that outputs a coded radar signal or coded radar data. Each coding circuit 250(1), 250(2) applies a phase shift to a received radar signal or received radar data derived from the received radar signal to generate a coded radar signal or coded radar data. Each coding circuit 250(1), 250(2) applies the phase shift according to the coding sequence provided by the coding control circuit 270. The coding sequences may be selected such that the coded radar signals or coded radar data generated by respective coding circuits 250(1), 250(2) are orthogonal or quasi-orthogonal with respect to one another. The coding sequences are, for example, a sequence of phase shift values, or values indicative of phase shifts, or control words that will trigger the coding circuit to perform a phase shift mapped to the control word. The coding sequences may be selected based on Doppler Division Multiplexing Scheme coding, Hadamard coding, or pseudo random phase multiplexing coding.

The coding control circuit 270 may provide the coding sequence to the coding circuits 250(1), 250(2) in any number of ways. For example, the coding control circuit 270 may include a respective register or a set of registers accessible to each respective coding circuit for use in controlling a phase shift. The coding control circuit 270 may be implemented in hardware or software executing stored instructions to read the coding sequence and store the phase shift values in the registers. In other examples, the coding control circuit 270 may be implemented in hardware or software executing stored instructions to generate control words or signals that adjust a phase shift performed by the coding circuit based on the coding sequence.

The summation circuit 260 includes respective inputs 262(1), 262(2) associated with each respecting coding circuit. The summation circuit 260 is configured to combine the coded radar signals or the coded radar data from the respective coding circuits 250(1), 250(2). When the summation circuit 260 combines coded radar signals (as opposed to coded radar data), the summation circuit 260 outputs, via output 264, a compressed radar signal which is subsequently converted to compressed radar data by an ADC (see FIGS. 4 and 5). When the summation circuit 260 combines coded radar data (as opposed to coded radar signals), the summation circuit 260 outputs compressed radar data (see FIG. 6). Thus, regardless of whether coded radar signals or coded radar data are combined by the summation circuit 260, the output of the compressive multiplexing system is compressed radar data which is provided to an output interface 280. As discussed above, compressed radar data includes data associated with multiple receive antennas in a same number of bits as originally encoded received radar data associated with a single receive antenna.

In one example, coding circuits 250(1), 250(2) include a hardware phase shifter, a group delay filter, or a phase shifting inverter. The summation circuit 260 may include an analog coupler, a digital adder circuit, or a software implemented adder. In FIG. 2, a compressive multiplexing system implemented for two receive chains is illustrated for simplicity. In other examples, such as those shown in FIGS. 3-6, there are more receive chains (with each receive chain including a coding circuit even if not visible in the figure).

Figure 3A:
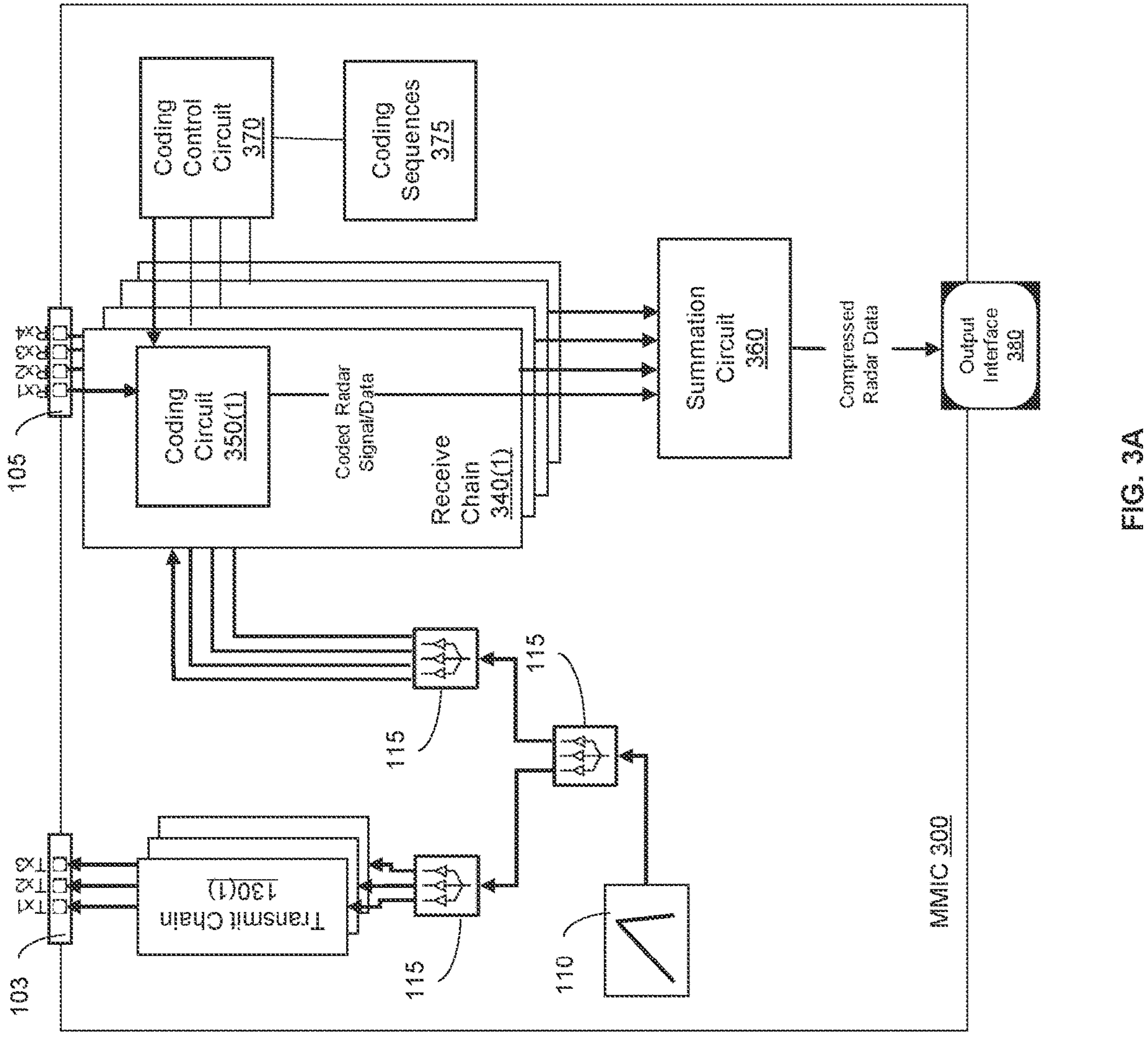
FIG. 3A illustrates an example monolithic microwave integrated circuit (MMIC) that includes an example compressive multiplexing system with a single summation circuit, in accordance with various aspects described.

FIG. 3A illustrates an example MMIC 300 that is a modified version of the MMIC 100. Many of the components of the MMIC 300 are substantially similar to corresponding components of the MMIC 100 of FIG. 1, these components have been assigned the same reference characters in subsequent figures and will not be described again. The MMIC 300 includes a compressive multiplexing system that compresses respective received radar signals from four receive antennas. The MMIC 300 includes four respective receive chains (referred to generally as 340 while only a first receive chain 340(1) is labeled in FIG. 3A), one receive chain for each receive antenna. In other examples, there are a different number of receive chains and there may not be one-to-one mapping between receive antennas and receive chains . . .

Each receive chain 340 includes a respective coding circuit (referred to generally as 350 while only 350(1) is visible in FIG. 3A). Each coding circuit applies a phase shift to a received radar signal or received radar data derived from the received radar signal according to a coding sequence to generate a coded radar signal or coded radar data. A summation circuit 360 is configured to combine the coded radar signals or the coded radar data to generate a compressed radar signal or compressed radar data. Each coding circuit 350 applies the phase shift according to a respective coding sequence provided by a coding control circuit 370. The respective coding sequences may be selected such that the coded radar signals or coded radar data generated by respective coding circuits 350 are orthogonal or quasi-orthogonal with respect to one another. The coding sequences are, for example, a sequence of phase shift values stored in a memory 375.

Figure 3B:
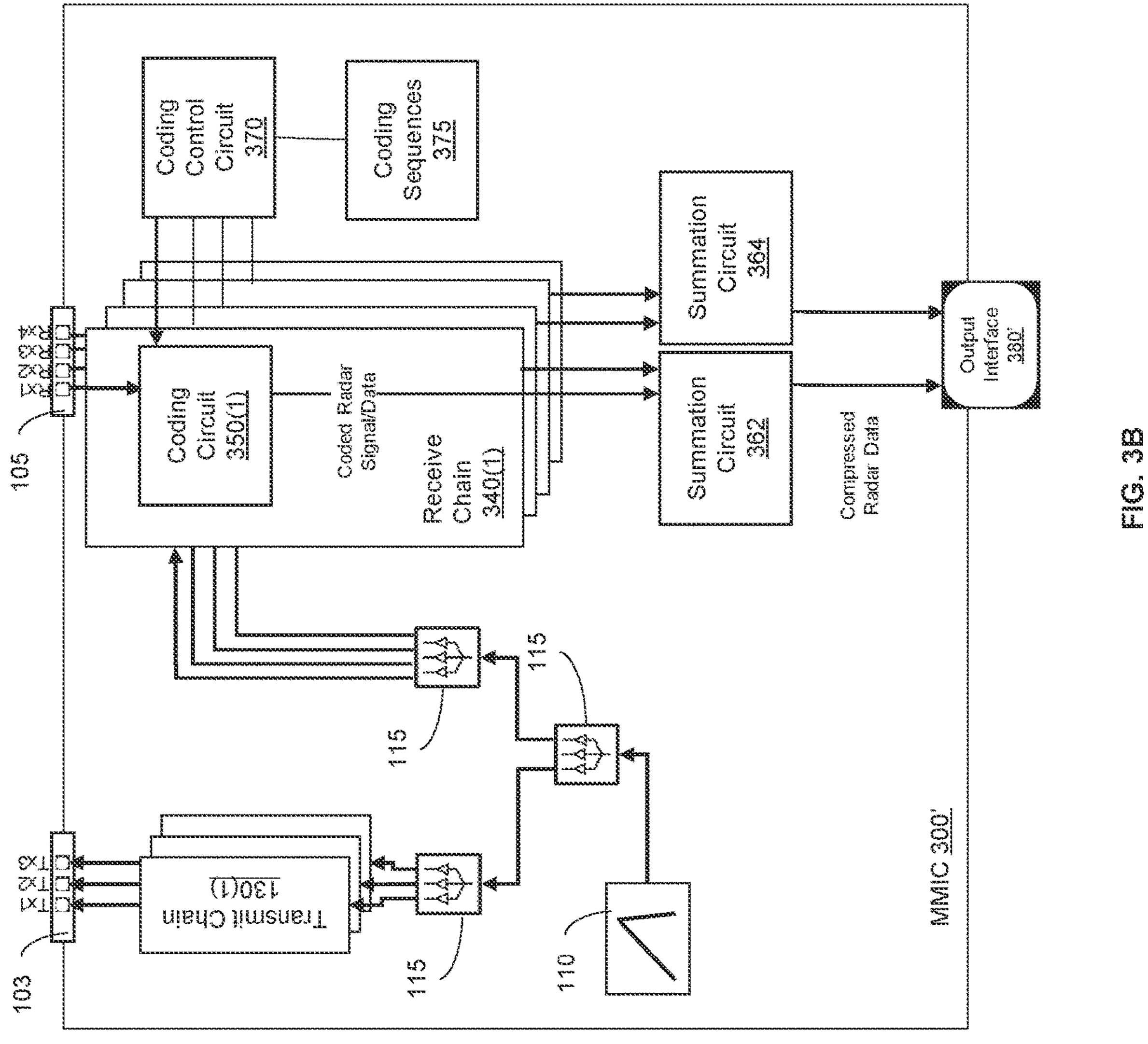
FIG. 3B illustrates an example monolithic microwave integrated circuit (MMIC) that includes an example compressive multiplexing system with a two summation circuits, in accordance with various aspects described.

FIG. 3B illustrates another example MMIC 300' that includes a compressive multiplexing system with two summation circuits 362, 364. Each of the summation circuits 362, 364 combines coded radar signals or coded radar data associated with two of the four receive chains. In this example, the output of the compressive multiplexing system is two instances of compressed radar data, so that the an amount of radar data that is output by the compressive multiplexing system and transmitted through an output interface 380' is twice a number of bits as originally encoded received radar data associated with a single receive antenna. For the remainder of the disclosure, compressive multiplexing systems that include a single summation circuit will be illustrated and described. However, it is to be understood that a compressive multiplexing system on an MMIC may include more than one summation circuit. The coding sequences may be selected such that the coded radar signals or coded radar data that are combined by a same summation circuit (e.g., 360 (FIG. 3A), 362, or 364) are orthogonal or quasi-orthogonal with respect to one another.

Figure 4:
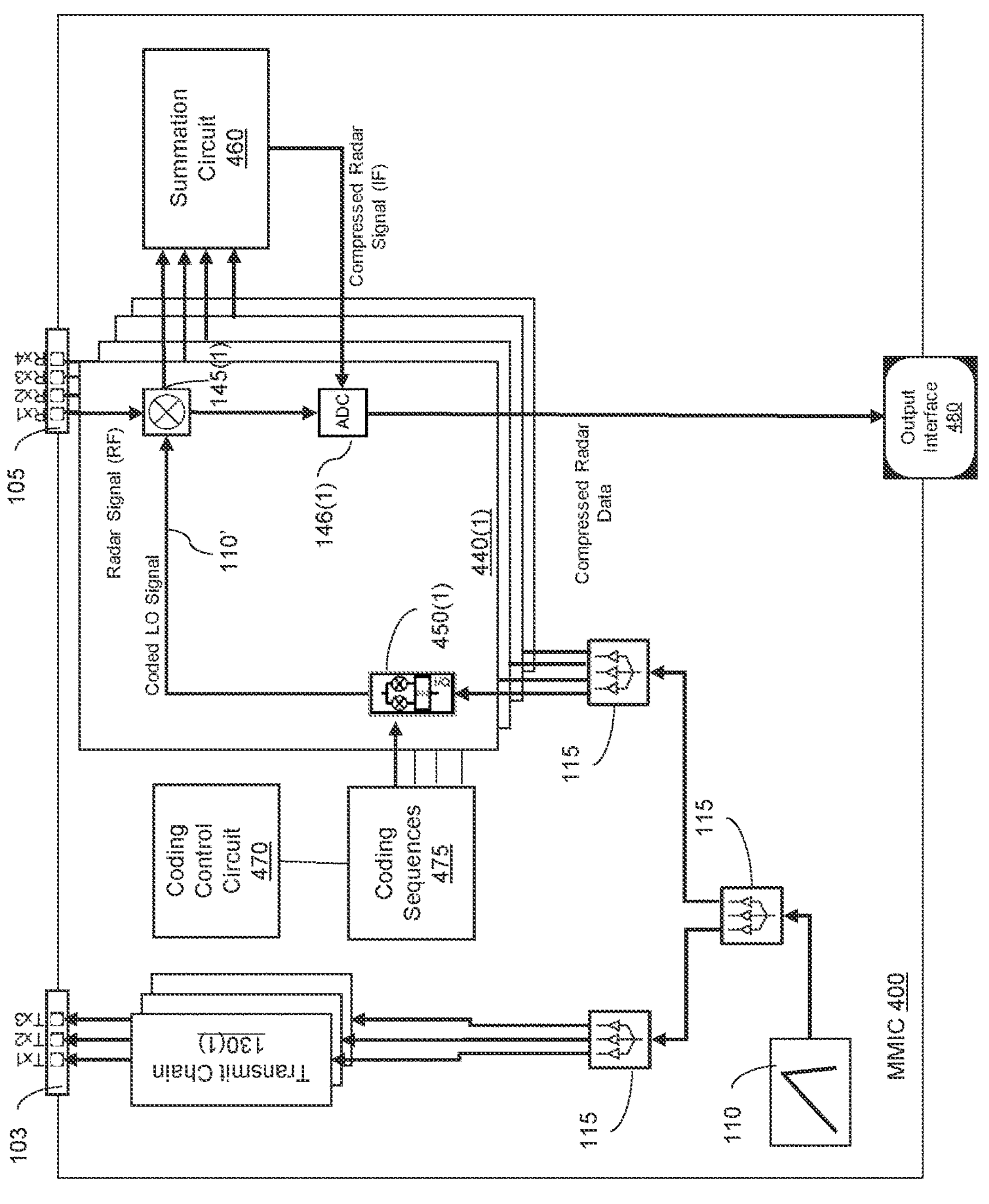
FIG. 4 illustrates an example monolithic microwave integrated circuit (MMIC) that includes an example compressive multiplexing system that performs local oscillator (LO) signal coding, in accordance with various aspects described.

FIG. 4 illustrates an MMIC 400 with four receive chains (referred to generally as 440 while only a first receive chain 440(1) is labeled in FIG. 4). The MMIC 400 features an example compressive multiplexing system including four respective coding circuits (referred to generally as 450 while only 450(1) is labeled in FIG. 4) associated with respective receive chains 440, a summation circuit 460, a coding control circuit 470, and coding sequences stored in memory 475. In this example, the respective coding circuits 450 apply a phase shift prescribed by a respective coding sequence to the LO signal received from the LO splitter 115 to generate a coded LO signal 110'. The coded LO signal is provided to an input of the mixer 145 to generate a down-converted or IF coded radar signal. The respective coded radar signals generated by the respective mixer circuits 145 are provided to the summation circuit 460, which combines the coded radar signals into a single analog compressed radar signal in the IF band. This analog compressed radar signal (IF) is provided to an ADC 146(1) associated with the first receive chain for conversion to compressed radar data.

It is noted that because the summation circuit 460 compresses the coded radar signals into a single analog compressed radar signal (IF), only one ADC is needed to generate the compressed radar data. This means that the ADCs associated with the other three receive chains are not necessary and may be eliminated. Further, while in the illustrated example the compressed radar signal (IF) is provided to the ADC(1) on the first receive chain 440(1), the ADC used to convert the compressed radar signal (IF) to compressed radar data may not be associated with a receive chain (e.g., the ADC may be associated with the summation circuit 460 or other component on the MMIC).

The coding circuit 450 may be an analog hardware based phase shifter having a control input which may be used to input the coding sequence phase shift values or corresponding control words.

Figure 5:
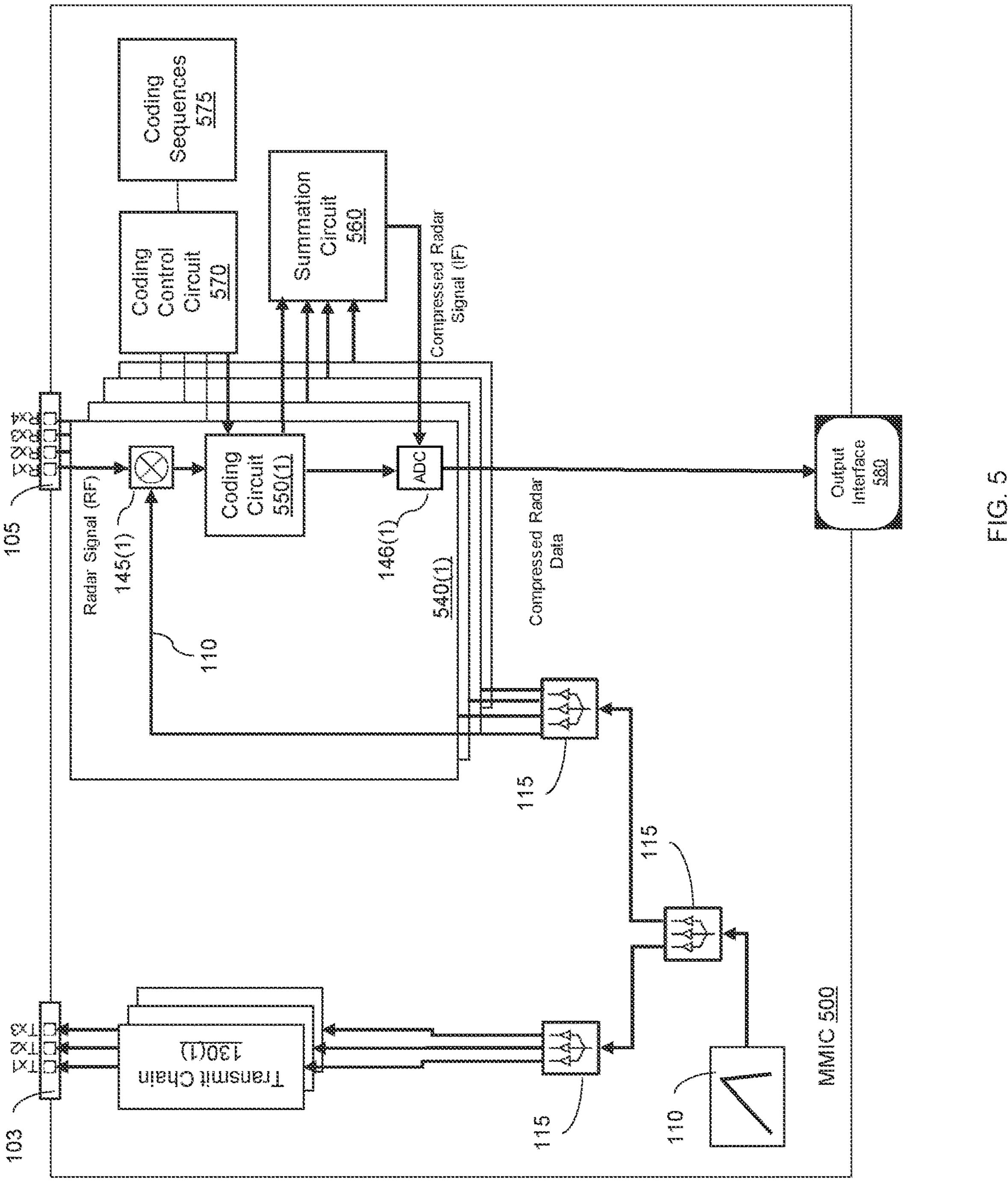
FIG. 5 illustrates an example monolithic microwave integrated circuit (MMIC) that includes an example compressive multiplexing system that performs intermediate frequency (IF) radar signal coding, in accordance with various aspects described.

FIG. 5 illustrates an MMIC 500 with four receive chains (referred to generally as 540 while only a first receive chain 540(1) is labeled in FIG. 5). The MMIC 500 features an example compressive multiplexing system including four respective coding circuits (referred to generally as 550 while only 550(1) is labeled in FIG. 5) associated with respective receive chains 540, a summation circuit 560, a coding control circuit 570, and coding sequences stored in memory 575. In this example, the respective coding circuits 550 apply a phase shift prescribed by a respective coding sequence to the down-converted radar signal (IF) generated by the mixer circuit 145 to generate a coded radar signal (IF). The respective coded radar signals generated by the respective coding circuits 550 are provided to the summation circuit 560, which combines the coded radar signals (IF) into a single analog compressed radar signal (IF). This analog compressed radar signal (IF) is provided to an ADC 146(1) associated with the first receive chain for conversion to compressed radar data.

It is noted that because the summation circuit 460 compresses the analog coded radar signals (IF) into a single compressed radar signal (IF), only one ADC is needed to generate the compressed radar data. This means that the ADCs associated with the other three receive chains are not necessary and may be eliminated. Further, while in the illustrated example the compressed radar signal (IF) is provided to the ADC(1) on the first receive chain 540(1), the ADC used to convert the compressed radar signal (IF) to compressed radar data may not be associated with a receive chain (e.g., the ADC may be associated with the summation circuit 560 or other component on the MMIC).

Figure 6:
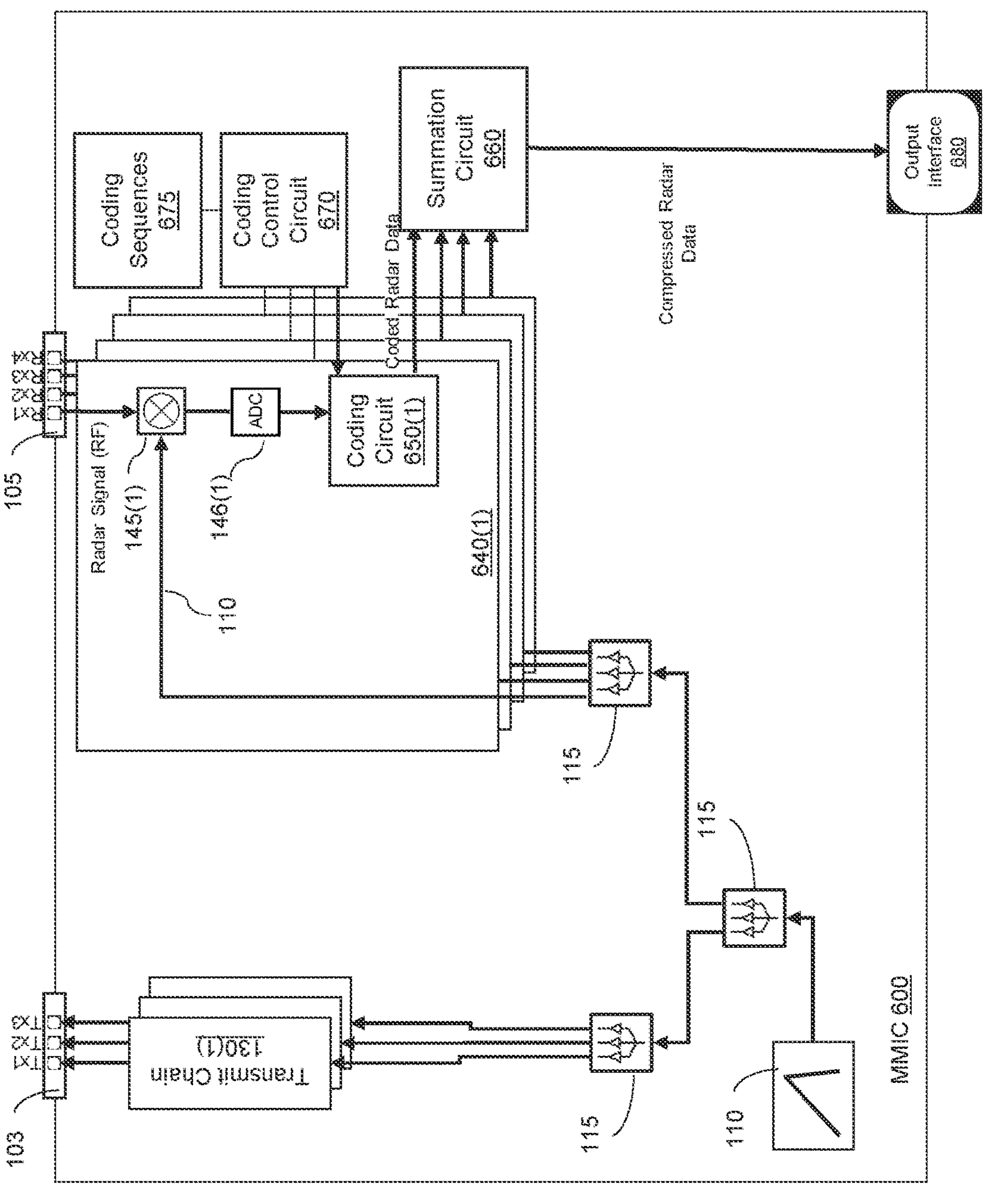
FIG. 6 illustrates an example monolithic microwave integrated circuit (MMIC) that includes an example compressive multiplexing system that performs digital radar data coding, in accordance with various aspects described.

FIG. 6 illustrates an MMIC 600 with four receive chains (referred to generally as 640 while only a first receive chain 640(1) is labeled in FIG. 6). The MMIC 600 features an example compressive multiplexing system including four respective coding circuits (referred to generally as 650 while only 650(1) is labeled in FIG. 6) associated with respective receive chains 640, a summation circuit 460, a coding control circuit 670, and coding sequences stored in memory 675. In this example, the respective coding circuits 650 apply a phase shift prescribed by a respective coding sequence to the radar data output by the respective ADCs 146 to generate respective coded radar data. The respective coded radar data from each respective coding circuit 650 are provided to the summation circuit 660, which combines the coded radar data to generate compressed radar data.

It is noted that while the summation circuits of FIGS. 4-6 are disposed in specific locations relative to the receive chains, the summation circuit may be disposed at any location after the coding circuit. It may be preferred to locate the summation circuit relatively close to the coding circuit to maximize the component savings realized by processing a compressed radar signal or compressed radar data as compared to individual radar signals or radar data.

Figures 7A, 7B, 7C:
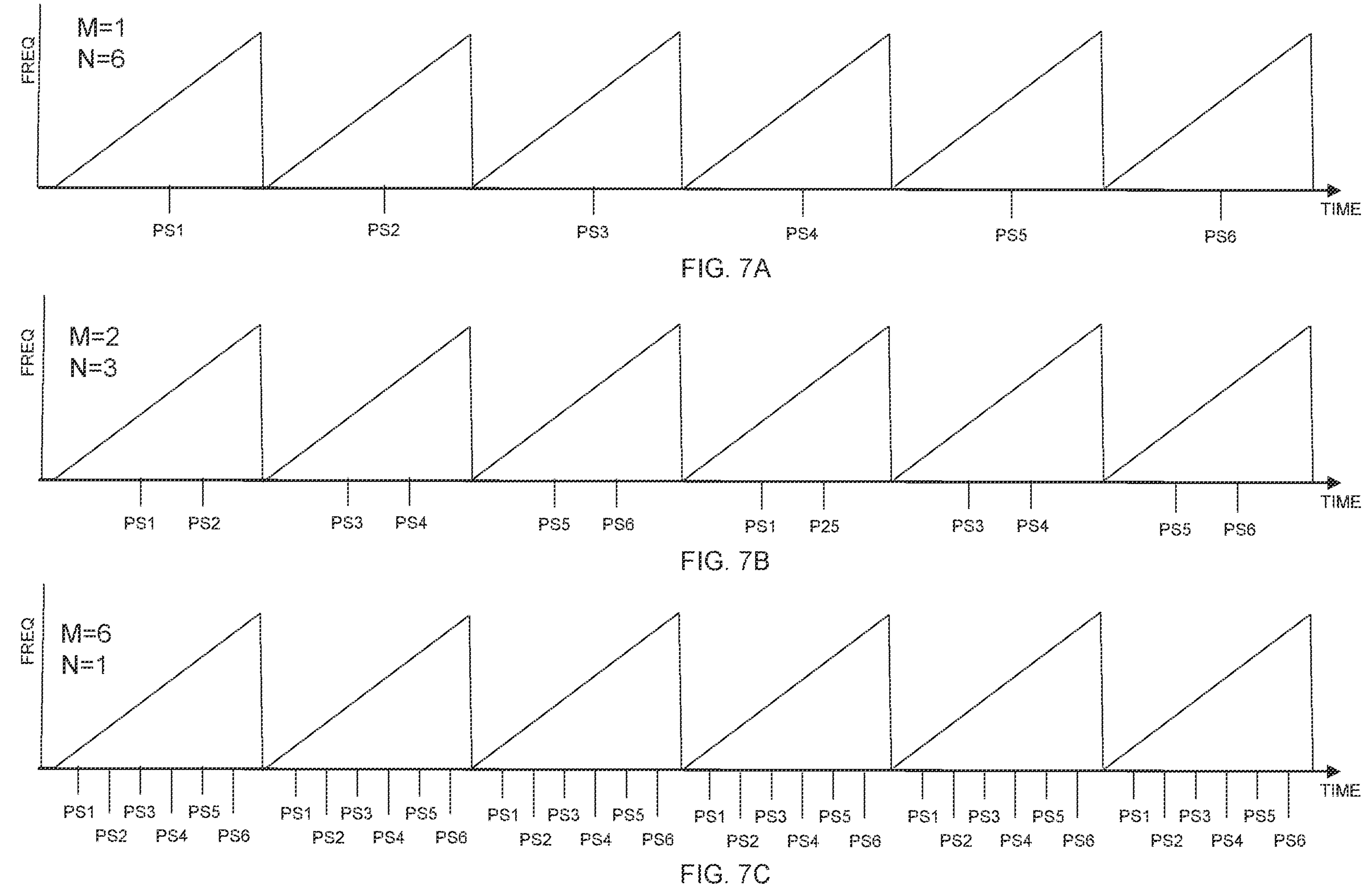
FIGS. 7A, 7B, 7C illustrate example coding sequences correlated with a ramp-based LO signal.

FIGS. 7A-7C illustrate different example configurations of a coding sequence. A plurality of coding sequences is stored for used by the compressive multiplexing system and each coding circuit applies a phase shift prescribed by one of the coding sequences. In the illustrated example, the coding sequence includes values indicative of or control words/signals that will cause the coding circuit to apply a sequence of six phase shifts PS1-PS6 to a radar signal or radar data. The phase shifts may have any value from 0° to 360°, including integer and non-integer values, and phase shift values may repeat within a coding sequence. In some examples, the phase shifts may be constrained to a value of either 0° or 180° (e.g., when the coding circuit includes a phase shifting inverter).

In the figures, the ramps of the LO signal are illustrated to indicate how the phase shifts of the coding sequence may be aligned in time with the ramps of the LO signal. The coding sequence has a length of M×N (e.g., 6 in the illustrated examples). M defines how many phase shifts are applied per ramp and N defines how many phase shifts are coded by the coding sequence. In the example of FIG. 7A, a single phase shift is applied per ramp and six ramps are coded by the sequence. In the example of FIG. 7B, two phase shifts are applied per ramp and three ramps are coded by the sequence. FIG. 7C, six phase shifts are applied per ramp and one ramp is coded by the sequence.

The coding control circuit provides phase shift values to respective coding circuits based on the coding sequences as configured per particular values of M and N. In one example, the values of M and N may be programmable.

Figure 8:
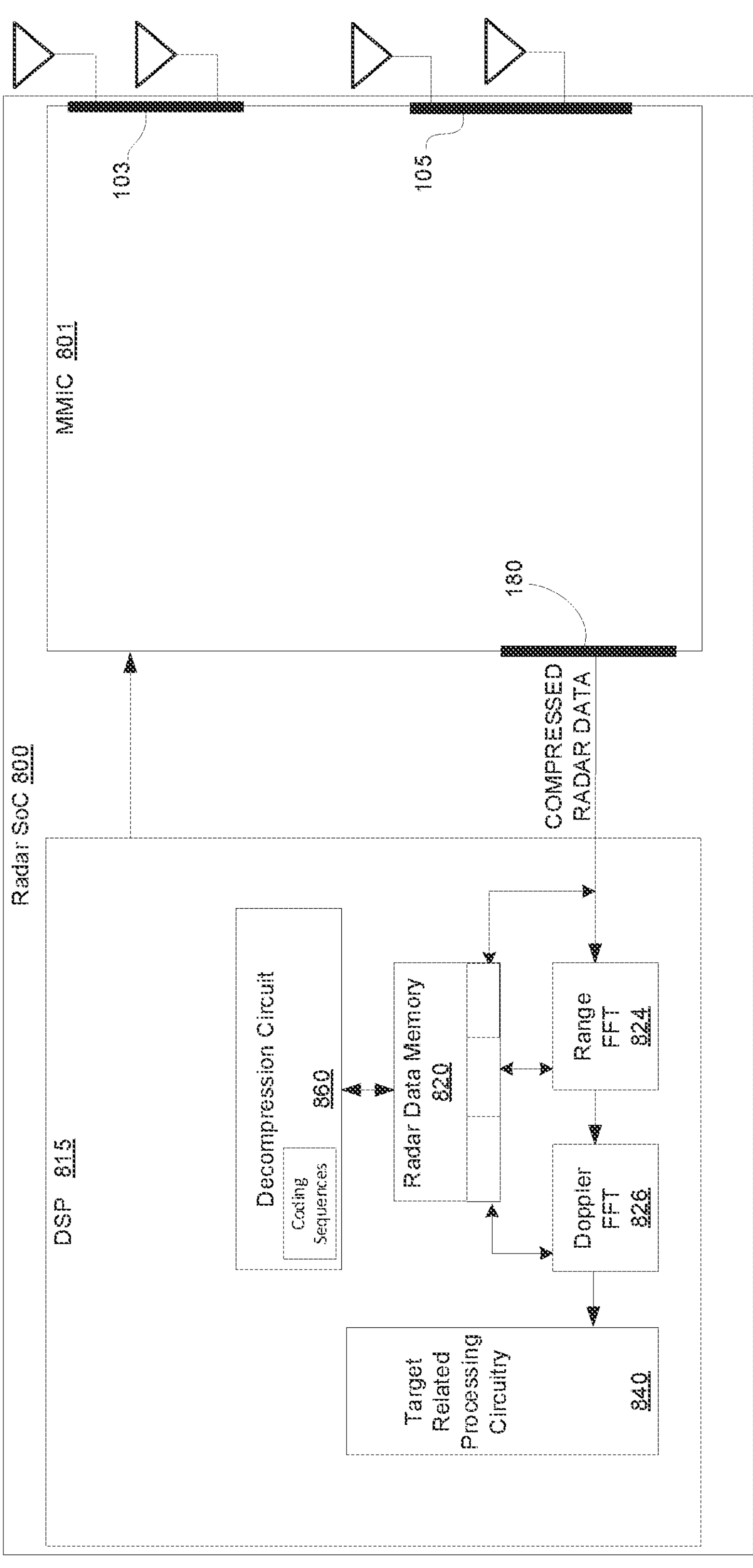
FIG. 8 illustrates an example radar system-on-chip (SOC) that includes decompression circuitry, in accordance with various aspects described.

FIG. 8 illustrates an example system-on-chip (SOC) 800 that includes a DSP 815 and an MMIC 801. The MMIC 801 includes a compressive multiplexing system as described with respect to any of FIG. 2, 3A, 3B, 4, 5, or 6. The compressive multiplexing system outputs, via the output interface 180, compressed radar data to the DSP 815. The DSP 815 includes radar data memory 820 that stores compressed radar data or uncompressed radar data as the compressed radar data is processed through a range fast Fourier transform (FFT) state 824, a Doppler FFT stage 826, and subsequent target related processing stages (generally 840).

The DSP 815 includes a decompression circuit 860 that processes compressed radar data stored in the radar data memory 820 to de-code (based on the coding sequences used to code the compressed radar data) and separate the compressed radar data back into separate radar data associated with each receive antenna. The separate radar data are stored in the radar memory for use by subsequent processing stages.

Figure 9:
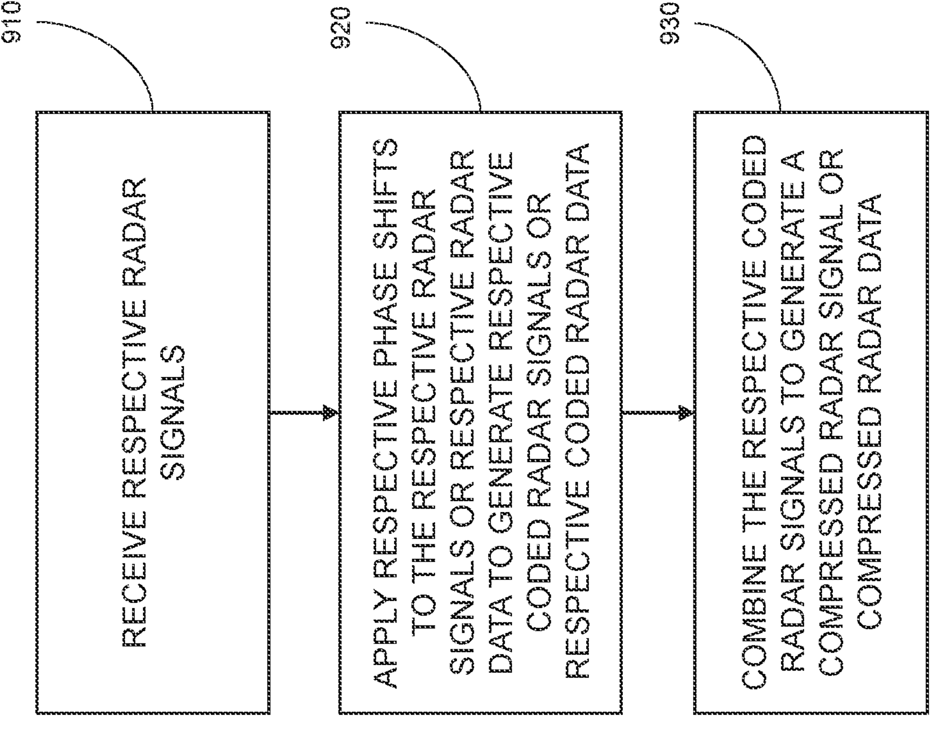
FIG. 9 is a flow diagram outlining an example method for performing compressive multiplexing on received radar signals, in accordance with various aspects described.

FIG. 9 illustrates an example method 900 for compressively multiplexing received radar signals. The method may be performed, for example, by the any of compressive multiplexing systems illustrated in FIGS. 2-6. The method includes, at 910, receiving respective radar signals from a plurality of antennas. At 920, respective phase shifts are applied to the respective received radar signals or to respective radar data derived from the respective received radar signals to generate respective coded radar signals or respective coded radar data. The operations associated with 920 may be performed by the coding circuits 250, 350, 450, 550, 650 illustrated in FIGS. 2, 3, 4, 5, and 6, respectively. The operations associated with 920 may be performed, for example, by hardware such as phase shifters, phase shifting inverters, or group delay filters.

The method includes, at 930, combining the respective coded radar signals or the respective coded radar data to generate a compressed radar signal or compressed radar data. The operations associated with 930 may be performed by the summation circuits 260, 360, 460, 560, 660 illustrated in FIGS. 2, 3, 4, 5, and 6, respectively. The operations associated with 930 may be performed, for example, by hardware such an analog coupler or digital adder circuit or a software implemented combination unit.

It is to be noted that the compressive multiplexing techniques disclosed herein are applicable to radar data corresponding to echoes of FMCW, OFDM, or PMCW radar transmit signals.

It can be seen from the foregoing description that the described systems, circuitries, and methods support compression of radar data so that radar data may be transmitted to a separate unit for processing.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for generating a frequency hopping radar signal according to embodiments and examples described herein.

Example 1 is a method, including receiving respective radar signals from a plurality of antennas; applying respective phase shifts to the respective received radar signals or to respective radar data derived from the respective received radar signals to generate respective coded radar signals or respective coded radar data; and combining the respective coded radar signals or the respective coded radar data to generate a compressed radar signal or compressed radar data.

Example 2 includes the subject matter of example 1, including or omitting optional elements, wherein the respective coded radar signals or respective coded radar data are orthogonal or quasi-orthogonal to one another.

Example 3 includes the subject matter of any of examples 1-2, including or omitting optional elements, wherein the respective received radar signals are down-converted based on an LO signal including a sequence of frequency ramps, the method further including applying the respective phase shifts based on a respective coding sequence having a length of M×N, wherein M is a number of phase shifts performed per frequency ramp and N is a number of frequency ramps coded by the respective coding sequence.

Example 4 includes the subject matter of any of examples 1-3, including or omitting optional elements, including applying the respective phase shifts using at least one of respective group delay filters, respective phase shifting inverters, or respective phase shifters.

Example 5 includes the subject matter of any of examples 1-4, including or omitting optional elements, including, for each respective radar signal, applying the respective phase shift to a local oscillator signal used to down-convert the respective received radar signal to an intermediate frequency.

Example 6 includes the subject matter of any of examples 1-5, including or omitting optional elements, including, for each respective received radar signal, down-converting the respective received radar signal to generate an intermediate frequency (IF) radar signal; and applying the respective phase shift to the IF radar signal.

Example 7 includes the subject matter of any of examples 1-6, including or omitting optional elements, including, for each respective radar signal, down-converting the respective received radar signal to generate an intermediate frequency (IF) radar signal; analog-to-digital converting the down-converted received radar signal to generate radar data; and applying the respective phase shift to the radar data.

Example 8 includes the subject matter of any of examples 1-7, including or omitting optional elements, wherein the respective phase shifts are based on Doppler Division Multiplexing Scheme, Hadamard coding, or pseudo random phase multiplexing coding.

Example 9 is a compressive multiplexing system, including a first coding circuit associated with a first receive chain configured to apply a first phase shift to a first received radar signal or first received radar data derived from the first received radar signal according to a first coding sequence to generate a first coded radar signal or first coded radar data; a second coding circuit associated with a second receive chain configured to apply a second phase shift to a second received radar signal or second received radar data derived from the second received radar signal according to a second coding sequence to generate a second coded radar signal or second coded radar data; a coding control circuit configured to provide the first coding sequence to the first coding circuit and the second coding circuit to the second coding circuit; and a summation circuit configured to combine the first coded radar signal or the first coded radar data with the second coded radar signal or the second coded radar data.

Example 10 includes the subject matter of example 9, including or omitting optional elements, wherein the first coding sequence and the second coding sequence are selected such that the first coded radar signal or the first coded radar data is orthogonal or quasi-orthogonal to the second coded radar signal or the second coded radar data.

Example 11 includes the subject matter of any of examples 9-10, including or omitting optional elements, wherein the first coding circuit and the second coding circuit include a hardware phase shifter, a group delay filter, or a phase shifting inverter.

Example 12 includes the subject matter of any of examples 9-11, including or omitting optional elements, wherein the first coding circuit is coupled between an LO signal splitter and a first local oscillator circuit that generates a signal used for down-converting the first received radar signal, and the second coding circuit is coupled between the LO signal splitter and a second local oscillator circuit that generates a signal used for down-converting the second received radar signal.

Example 13 includes the subject matter of any of examples 9-12, including or omitting optional elements, wherein the first coding circuit is coupled between an output of a first mixer circuit that down-converts the first received radar signal to an intermediate frequency and a first analog to digital converter (ADC) that converts the down-converted first received radar signal to first radar data, and the second coding circuit is coupled between an output of a second mixer circuit that down-converts the second received radar signal to an intermediate frequency and a second analog to digital converter (ADC) that converts the down-converted second received radar signal to second radar data.

Example 14 includes the subject matter of any of examples 9-13, including or omitting optional elements, wherein the first coding circuit is coupled to an output of a first analog to digital converter (ADC) that converts a down-converted first received radar signal to first radar data, and the second coding circuit is coupled to an output of a second analog to digital converter (ADC) that converts a down-converted second received radar signal to second radar data.

Example 15 includes the subject matter of any of examples 9-14, including or omitting optional elements, wherein the first received radar signal and the second received radar signal are down-converted based on an LO signal including a sequence of frequency ramps, further wherein the first coding sequence and the second coding sequence have a length of $M \times N$, wherein M is a number of phase shifts performed per frequency ramp and N is a number of frequency ramps coded by the respective coding sequence.

Example 16 includes the subject matter of any of examples 9-,15 including or omitting optional elements, wherein a compressed radar signal is provided to an analog-to-digital converter.

Example 17 is a radio frequency (RF) circuit, including a plurality of respective receive chains coupled to a respective plurality of receive antenna connections, wherein each respective receive chain includes a coding circuit; a coding control circuit coupled to each respective coding circuit; and a summation circuit including respective inputs coupled to respective outputs of respective coding circuits and an output coupled to an output interface of the RF circuit.

Example 18 includes the subject matter of example 17, including or omitting optional elements, further including a local oscillator signal splitter; and wherein an input of the respective coding circuits are coupled to the local oscillator signal splitter, each respective receive chain includes a mixer circuit including a first input, a second input, and an output, the mixer circuit connected by the first input to a respective receive antenna connection, by the second input to the output of the coding circuit, and by the output to a respective input of the summation circuit, and the output of the summation circuit is coupled to an analog-to-digital converter.

Example 19 includes the subject matter of any of examples 17-18, including or omitting optional elements, wherein each respective receive chain includes a mixer circuit having a first input, a second input, and an output, the mixer circuit connected by the first input to a respective receive antenna connection, by the second input to a local oscillator signal splitter, and by the output to the coding circuit, an output of the coding circuit is coupled to a respective input of the summation circuit, and the output of the summation circuit is coupled to an input of an ADC.

Example 20 includes the subject matter of any of examples 17-19, including or omitting optional elements, wherein each respective receive chain includes a mixer circuit having a first input, a second input, and an output, the mixer circuit connected by the first input to a respective receive antenna connection and by the second input to a local oscillator signal splitter, and an analog to digital converter including an input coupled to the output of the mixer and an output coupled to an input of the coding circuit, wherein an output of the coding circuit is coupled to a respective input of the summation circuit.

Example 21 includes the subject matter of any of examples 17-20, including or omitting optional elements, wherein the coding circuit includes at least one of phase shifter, a group delay filter, or a phase shifting inverter.

Example 22 includes the subject matter of any of examples 17-21, including or omitting optional elements, wherein the summation circuit includes at least one of an analog coupler or a digital adder circuit.

Example 23 includes the subject matter of any of examples 17-22, including or omitting optional elements, wherein coding sequences are selected such that respective coded radar signals or coded radar data generated by respective coding circuits in respective receive chains are orthogonal or quasi-orthogonal with respect to one another.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale.

As utilized herein, terms "module", "component," "system," "circuit," "circuitry," "element," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A method, comprising:

receiving respective radar signals from a plurality of antennas;

down-converting the received respective radar signals to generate respective intermediate frequency (IF) radar signals; and applying a respective phase shift to each respective IF radar signal to generate respective coded radar signals, wherein the respective phase shifts are determined based on a coding sequence;

combining the respective coded radar signals to generate a compressed radar signal;

converting the compressed radar signal into digital compressed radar data; and providing the compressed digital radar data to a digital signal processor (DSP) for use in detecting objects.

2. The method of claim 1, wherein the respective coded radar signals are orthogonal or quasi-orthogonal to one another.

3. The method of claim 1, wherein the respective radar signals are down-converted based on an LO signal including a sequence of frequency ramps, the method further comprising applying the respective phase shifts based on a respective coding sequence having a length of M×N, wherein M is a number of phase shifts performed per frequency ramp and N is a number of frequency ramps coded by the respective coding sequence.

4. The method of claim 1, comprising applying the respective phase shifts using at least one of respective group delay filters, respective phase shifting inverters, or respective phase shifters.

5. The method of claim 1, wherein the respective phase shifts are based on a Doppler Division Multiplexing Scheme, Hadamard coding, or pseudo random phase multiplexing coding.

6. A compressive multiplexing system, comprising:

a first receive chain, comprising a first mixer circuit configured to down-convert a first received radar signal to a first intermediate frequency (IF) signal;

a first coding hardware circuit configured to apply a first phase shift to the first IF signal according to a first coding sequence to generate a first coded radar signal;

a second receive chain, comprising a second mixer circuit configured to down-convert a second received radar signal to a second IF signal;

a second coding hardware circuit configured to apply a second phase shift to the second IF signal according to a second coding sequence to generate a second coded radar signal;

a coding control hardware circuit configured to provide the first coding sequence to the first coding hardware circuit and the second coding sequence to the second coding hardware circuit; and a summation hardware circuit configured to combine the first coded radar signal with the second coded radar signal to generate a compressed radar signal; and an analog-to-digital converter (ADC) configured to convert the compressed radar signal into digital compressed radar data; and an output interface configured to output the compressed digital radar data to a digital signal processor (DSP) for use in detecting objects based on the first received radar signal and the second received radar signal.

7. The compressive multiplexing system of claim 6, wherein the first coding sequence and the second coding sequence are selected such that the first coded radar signal is orthogonal or quasi-orthogonal to the second coded radar signal.

8. The compressive multiplexing system of claim 6, wherein the first coding hardware circuit and the second coding hardware circuit comprise a hardware phase shifter, a group delay filter, or a phase shifting inverter.

9. The compressive multiplexing system of claim 6, wherein the first received radar signal and the second received radar signal are down-converted based on an LO signal including a sequence of frequency ramps, further wherein the first coding sequence and the second coding sequence have a length of M×N, wherein M is a number of phase shifts performed per frequency ramp and N is a number of frequency ramps coded by the respective coding sequence.

10. A radio frequency (RF) circuit, comprising:

a plurality of respective receive chains coupled to a respective plurality of receive antenna connections, wherein each respective receive chain comprises a down-converter configured to down-convert a received radar signal based on an LO signal that includes a sequence of frequency ramps, and a coding circuit configured to apply a sequence of phase shifts to a received radar signal to generate a coded radar signal;

a coding control circuit coupled to each respective coding circuit, the coding control circuit configured to provide an indication of the sequence of phase shifts to the coding circuit, wherein the sequence of phase shifts comprises one or more phase shifts per frequency ramp in the LO signal; and a summation circuit comprising respective inputs coupled to respective outputs of respective coding circuits and an output coupled to an analog-to-digital converter (ADC); and an output interface coupled to the output of the ADC.

11. The RF circuit of claim 10, further comprising:

a local oscillator signal splitter; and wherein an input of the respective coding circuits is coupled to the local oscillator signal splitter, and each respective receive chain comprises a mixer circuit comprising a first input, a second input, and an output, the mixer circuit connected by the first input to a respective receive antenna connection, by the second input to the output of the coding circuit, and by the output to a respective input of the summation circuit.

12. The RF circuit of claim 10, wherein each respective receive chain comprises a mixer circuit having a first input, a second input, and an output, the mixer circuit connected by the first input to a respective receive antenna connection, by the second input to a local oscillator signal splitter, and by the output to the coding circuit, an output of the coding circuit is coupled to a respective input of the summation circuit.

13. The RF circuit of claim 10, wherein the coding circuit comprises at least one of a phase shifter, a group delay filter, or a phase shifting inverter.

14. The RF circuit of claim 10, wherein the summation circuit comprises an analog coupler.

15. The RF circuit of claim 10, wherein the phase shifts are selected such that respective coded radar signals are orthogonal or quasi-orthogonal with respect to one another.

* * * * *